(12) United States Patent
Kaufmann et al.

(10) Patent No.: US 6,363,305 B1
(45) Date of Patent: Mar. 26, 2002

(54) STEER-BY-WIRE SYSTEM

(75) Inventors: Timothy Wesley Kaufmann, Frankenmuth; Michael D. Byers, Ypsilanti, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/666,497

(22) Filed: Sep. 18, 2000

Related U.S. Application Data
(60) Provisional application No. 60/154,453, filed on Sep. 17, 1999.

(51) Int. Cl.[7] ............................ B62D 1/00; B62D 5/00; B62D 101/00; B62D 113/00; B62D 153/00; G05D 1/00; G05D 3/00; G05D 13/00; G06F 7/00; G06F 17/00; G06F 19/00

(52) U.S. Cl. ............................ 701/41; 701/42; 701/43; 701/44; 701/33; 340/575; 340/465; 340/576; 303/139; 303/146; 303/191; 303/192; 33/203; 33/203.18; 180/402; 180/403; 180/444; 180/445; 180/446; 280/5.51; 280/211; 280/775; 280/779

(58) Field of Search .................. 701/41, 42, 43, 701/44, 33; 340/575, 465, 576; 303/139, 146, 191, 192; 33/203.18, 203; 180/402, 403, 444, 445, 446; 280/211, 5.51, 775, 779

(56) References Cited

U.S. PATENT DOCUMENTS

| | | | |
|---|---|---|---|
| 4,860,844 A | * 8/1989 | O'neil ........................ 180/79.1 |
| 5,228,757 A | * 7/1993 | Ito et al. ...................... 303/100 |
| 5,251,135 A | 10/1993 | Serizawa et al. ............ 364/424 |
| 5,347,458 A | 9/1994 | Serizawa et al. ............ 364/424 |
| 5,576,957 A | 11/1996 | Asanuma et al. ....... 364/244.05 |
| 5,653,304 A | 8/1997 | Renfroe ....................... 180/402 |
| 5,668,722 A | 9/1997 | Kaufman et al. ............. 701/41 |
| 5,740,040 A | 4/1998 | Kifuku et al. ............... 364/242 |
| 5,828,972 A | * 10/1998 | Asanuma et al. .............. 701/41 |
| 5,829,547 A | * 11/1998 | Fujii et al. ................... 180/422 |
| 5,925,083 A | 7/1999 | Ackerman .................... 701/41 |
| 6,018,691 A | 1/2000 | Yamamoto et al. ........... 701/41 |
| 6,097,286 A | 8/2000 | Discenzo .................... 340/465 |
| 6,098,296 A | * 8/2000 | Perisho, Jr. et al. .......... 33/203 |
| 6,102,151 A | 9/2000 | Shimizu et al. ............. 180/446 |
| 6,152,254 A | * 11/2000 | Philips ....................... 180/422 |
| 6,176,341 B1 | * 1/2001 | Ansari ........................ 180/402 |
| 6,179,394 B1 | * 1/2001 | Browalski et al. .......... 303/146 |

FOREIGN PATENT DOCUMENTS

| | | |
|---|---|---|
| EP | 88101474.0 | 2/1988 |
| EP | 0858408 | 10/1996 |
| EP | 0985591 | 8/1999 |
| JP | 1115778 | 1/1989 |
| JP | 360259570 A | * 12/1995 |
| WO | 00/34106 | 6/2000 |

OTHER PUBLICATIONS

J.Y. Wong, Ph.D., Theory of Ground Vehicles, 1978, pp. 210–214.

* cited by examiner

Primary Examiner—William A. Cuchlinski, Jr.
Assistant Examiner—Ronnie Mancho
(74) Attorney, Agent, or Firm—Edmund P. Anderson

(57) ABSTRACT

A closed loop steer by wire control system has three main components, a steering wheel unit, a roadwheel unit, and a master control unit. Signals generated by sensors in the steering wheel unit and roadwheel unit are passed back to the master control unit for processing. These signals include tie-rod force signals, and a steering wheel position signal. The master control unit uses these signals to calculate a steering wheel reaction torque signal which is sent back to the steering wheel unit to provide the operator with tactile feedback, while roadwheel command signals are sent to roadwheel units to provide steering direction. An Ackerman correction unit is also used to correct the left and right roadwheel positions to track about a common center.

14 Claims, 6 Drawing Sheets

STEER-BY-WIRE SYSTEM

CROSS-REFERENCE TO RELATED APPLICATIONS

This application is based upon, and claims the benefit of, U.S. provisional patent application No. 60/154,453, filed Sep. 17, 1999, the disclosures of which are incorporated by reference herein in their entirety.

FIELD OF THE INVENTION

This disclosure relates to steer-by-wire vehicle control systems.

BACKGROUND OF THE INVENTION

Steering equipment for assisting a driver to steer an automobile is well known in the art. In conventional steering assemblies, the operator controls the direction of the vehicle with the aid of a steering wheel. This wheel is mechanically connected, usually through a gear assembly to the roadwheels. To aid the operator, many systems utilize a an auxiliary system to generate a force that is transmitted to a steering gear assembly. The additional force reduces the effort required by the operator in changing the direction of the vehicle. Typically, this auxiliary force is generated by either a hydraulic drive or an electric motor.

Because the steering wheel is connected directly to the roadwheels, the resulting mechanical assembly that provides the connection can be quite complicated and expensive to produce. The one advantage in having a direct connection is that the operator receives tactile feedback through the steering wheel. For example, if the vehicle changes directions while it is moving, the operator will feel resistance in the steering wheel.

Therefore, is it considered advantageous to provide a steering control system that is less expensive than a traditional mechanical system while still providing the tactile feedback to the operator.

BRIEF SUMMARY OF THE INVENTION

The present invention is directed to a control system that provides a vehicle operator with an electronic steering or steer-by-wire control for a vehicle. The steer-by-wire control system comprises a roadwheel unit, a steering wheel unit, and a master control unit that operate together to provide steering control for the vehicle operator. The roadwheel unit has several sensors including a roadwheel position sensor and a tie-rod force sensor that are used to provide a signal to the master control unit. The steering wheel unit has a sensor for detecting steering wheel position, this sensor is used to provide a signal to the master control unit. Signals from the sensors in the roadwheel unit and steering wheel unit are received by the master control unit where they are used to calculate roadwheel command signals and steering wheel reaction torque signals. The resulting roadwheel command signal is sent back to the roadwheel unit to change the direction of the vehicle, while the steering wheel reaction torque signal is sent to the steering wheel unit where it is used to provide tactile feedback to the vehicle operator. The present invention also utilizes an Ackerman correction control to adjust the left and right roadwheel angles to correct for errors in the steering geometry so that the wheels will track about a common turn center.

DETAILED DESCRIPTION OF THE INVENTION

Figure 1:
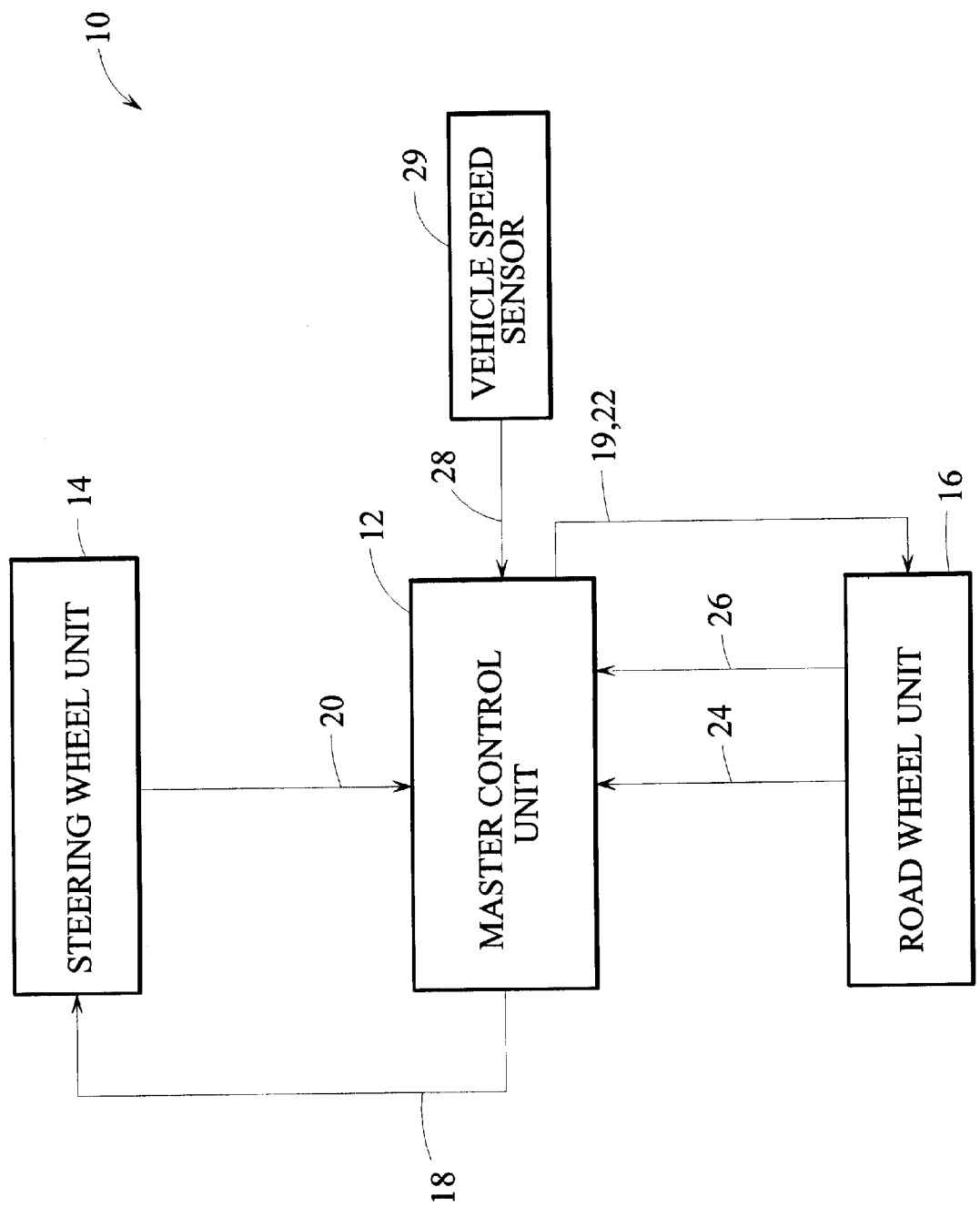
FIG. 1 is a block diagram illustrating the steering control system of the present invention.

Referring to FIG. 1, there is shown an automobile steering control system. The steering system 10 comprises several closed loop subsystems that work together to provide an operator with control over the direction of the vehicle. A steering wheel unit 14 detects the position and movement of a steering wheel (not shown) and sends a steering wheel position signal 20 to the master control unit 12.

The master control unit 12 combines the information of the steering wheel position 20 with a speed signal 28 from the vehicle speed sensor 29 and the tie rod force signals 24, 26 from the roadwheel unit 16. Using these input signals, the master control unit 12 produces roadwheel command signals 19, 22 that are sent to the roadwheel unit 16. A steering wheel reaction torque signal 18 is sent to the steering wheel unit 14. Each of the major systems may have additional functionality that will be described in more detail herein. As used herein, signal connections may physically take any form capable of transferring a signal, including electrical, optical, or radio.

Figure 2:
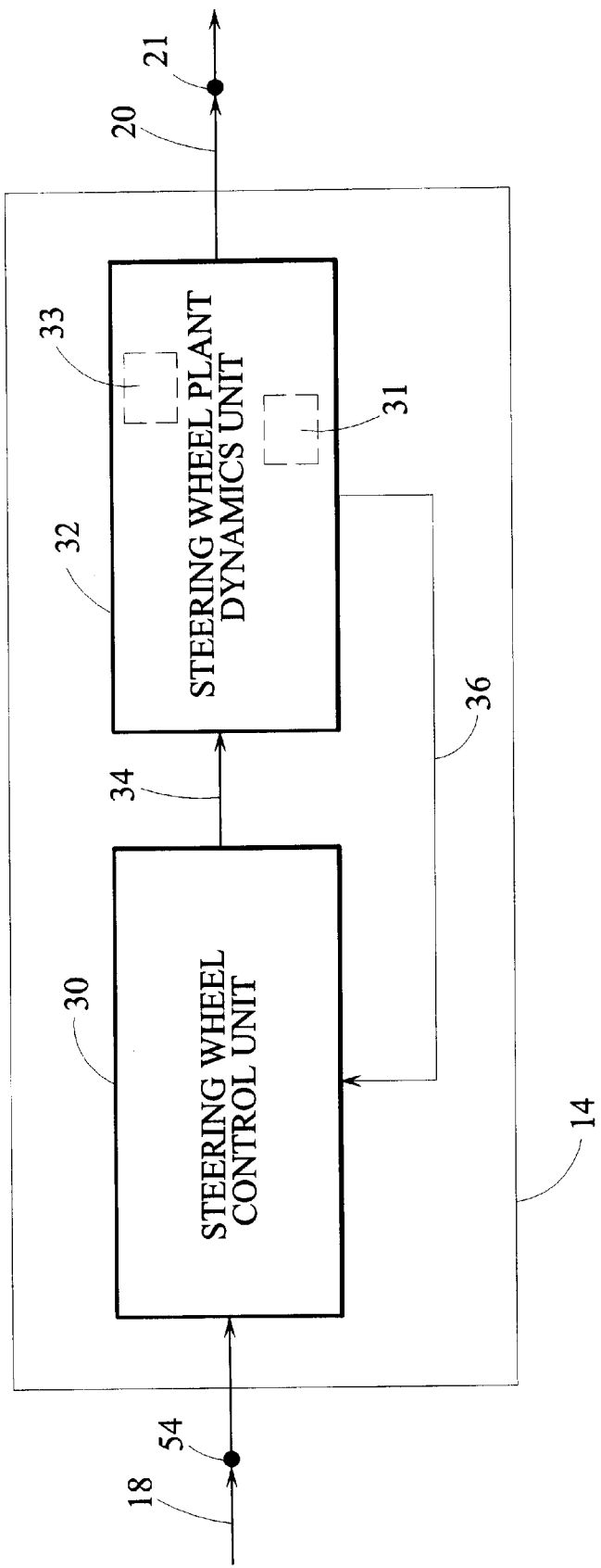
FIG. 2 is a block diagram of the steering wheel unit shown in FIG. 1.

Referring to FIG. 2, the steering wheel unit 14 is a closed loop control system that uses steering wheel torque as the feedback signal. The steering wheel reaction torque signal 18 is received from input terminal 54 into the steering wheel control unit 30 where the signal is compared to the feedback torque sensor signal 36 (a simple method of comparison is simply to subtract one signal from another. A zero result indicates that the desired torque is being applied). A torque command signal 34 is then passed to the plant dynamics unit 32 as needed to comply with the steering wheel reaction torque signal 18. The steering wheel plant dynamics unit 32 contains the necessary elements to provide a reaction torque to the operator as well as a torque sensor 31 to provide the feedback 36 to the control unit 30 and a steering wheel position sensor 33 that produces and sends a steering wheel position signal via line 20 through the node 21. Generally, reaction torque will be imparted to the operator by an electric motor coupled either to the steering column or the rack. Preferred reaction torque motors are those with reduced torque ripple, such as are described in detail in copending, commonly assigned U.S. patent application Ser. No. 09/565,116, entitled TORQUE RIPPLE FREE ELECTRIC POWER STEERING, filed Sep. 6, 2000, the disclosures of which are incorporated by reference herein in their entirety. Current control of the reaction torque motor may be desired to minimize damping, though this is not required.

Figure 3:
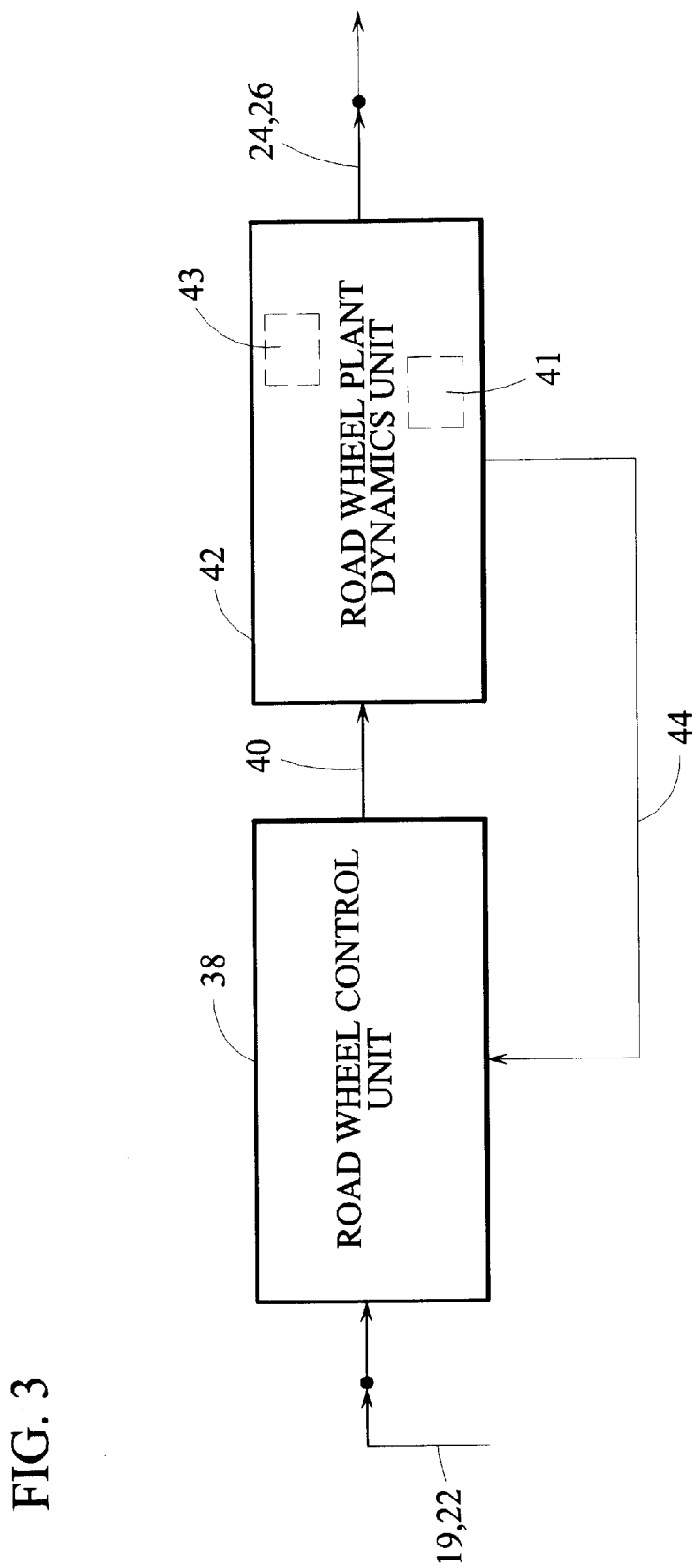
FIG. 3 is a block diagram of the roadwheel unit shown in FIG. 1.

Referring to FIG. 3, the roadwheel unit 16, like the steering wheel unit, is also a closed loop control system that uses roadwheel position as a feedback signal. There is a roadwheel unit for each steerable wheel, though only one is shown in the drawing. Within the roadwheel unit 16, the roadwheel command signal (19 for the left wheel, 22 for the right) is received from the master control unit and compared with the roadwheel position signal 44 within the control unit 38. A roadwheel position command signal 40 is sent to the roadwheel plant dynamics unit 42. The plant dynamics unit 42 contains the necessary elements to control the position of the automobile wheels as well as a roadwheel position sensor 41 to provide feedback signal 44 of the roadwheel position. A tie rod sensor 43 is also located within plant dynamics unit 42. The tie rod sensor 43 detects and also measures the forces on the tie rods and sends a signal (24 for one wheel, 26 for the other) representative of the measured forces to the master control unit 12.

Figure 4:
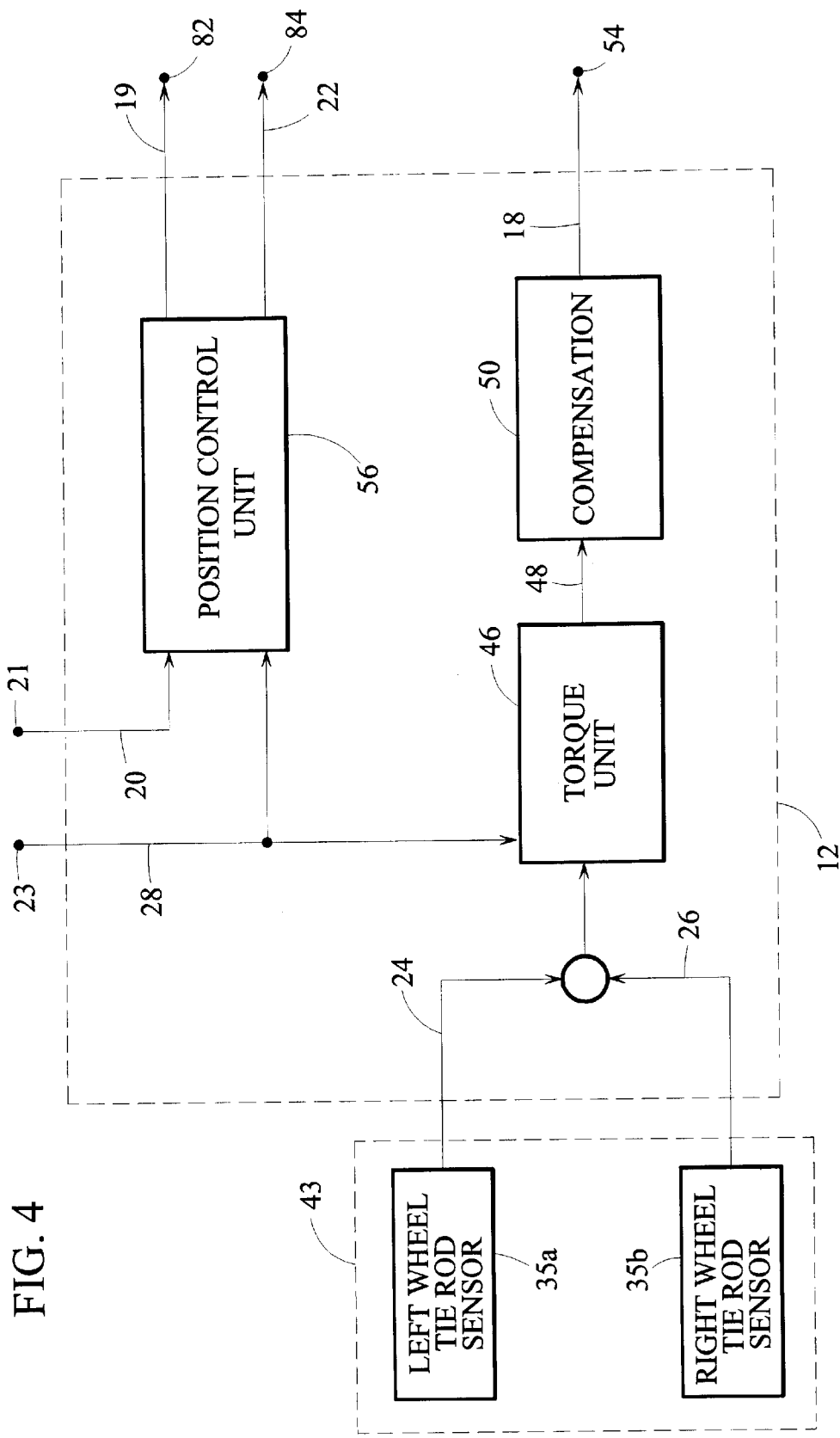
FIG. 4 is a block diagram of the master control unit shown in FIG. 1.

FIG. 4 shows a more detailed view of the master control unit 12. As discussed above, the roadwheel plant dynamics unit 42 has a tie rod sensor 43. In a preferred embodiment, this sensor 43 comprises a left and right tie rod force sensor 35a, 35b that each measure and transmit a signal representative of the left and right roadwheel tie rod respectively. These signals are sent via lines 24, 26 to a torque unit 46 that uses the force signals to calculate a steering wheel reaction torque command signal, which is sent via line 48 to the compensation unit 50. In a preferred embodiment, the torque unit 46 will index the composite tie-rod force signals into a set of one or more torque look-up tables. Where more than one look-up table is used, the outputs are preferably blended based upon a ratio dependent upon the vehicle speed signal 28. For example, two lookup tables might be used, one for low speeds and one for highway speeds. As the vehicle speed signal increases, the table for highway speeds becomes increasingly dominant in the blend over the table for low speeds.

Generally, the steering wheel unit will have a compliant torque sensor (such as a T-bar) with two masses at each end (motor inertia and steering wheel inertia) as is common in the art. A frequency based compensator 50 is preferably used to generate an adjusted steering wheel reaction torque command signal 18 to compensate for the compliancy.

The master control unit 12 also receives the steering wheel position signal through line 20 via node 21. This signal 20 is used to generate the roadwheel position command signals 19, 22 within the position control unit 56 and output the signals to nodes 82 and 84.

Figure 5:
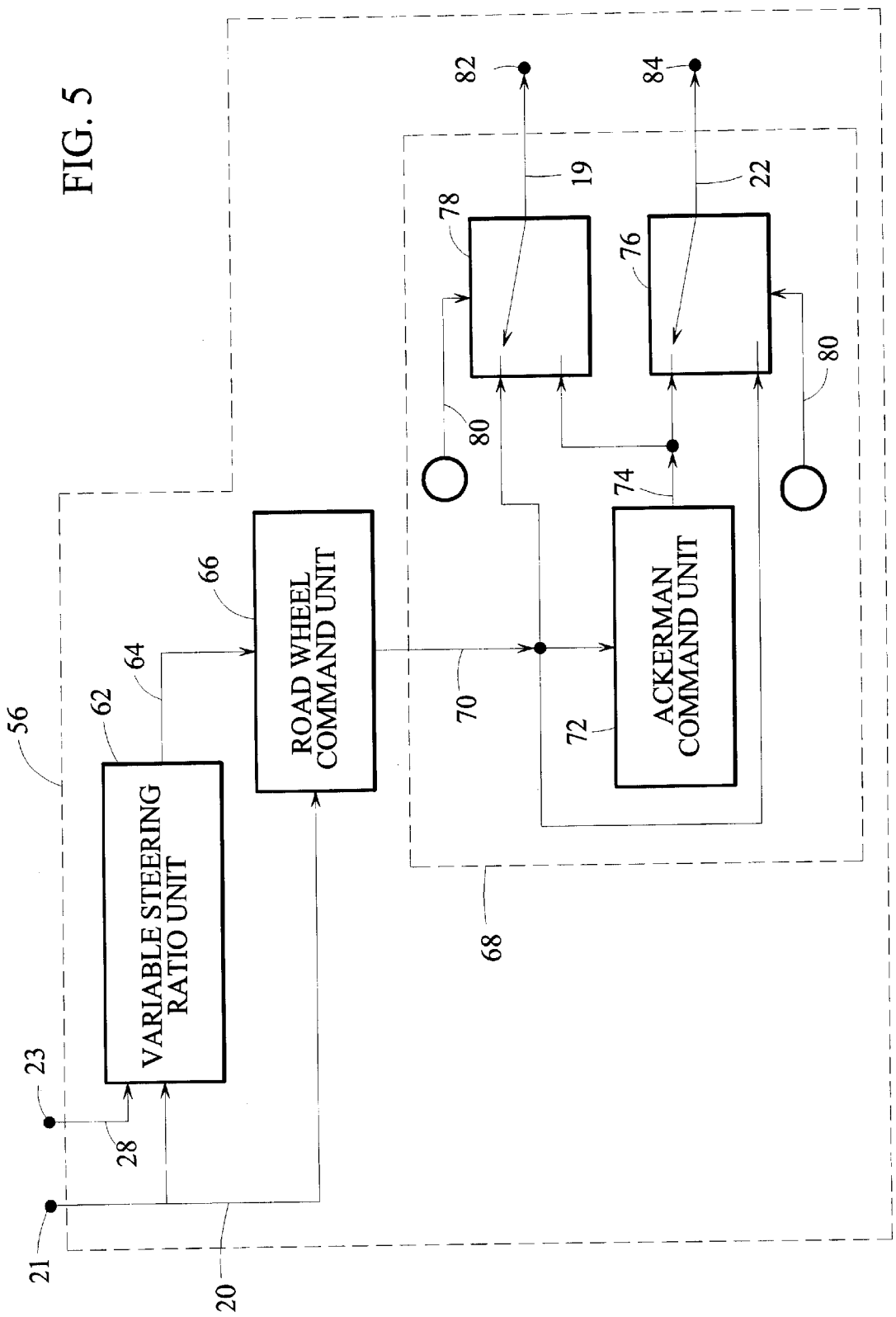
FIG. 5 is a block diagram of the position control unit shown in FIG. 4.

Referring to FIG. 5, the position control unit 56 has several sub components that are used in the calculation of the left and right hand roadwheel command signals 19, 22. The steering wheel position signal is received by the variable steering ratio unit 62 via line 20. The ratio unit 62 also receives the vehicle speed signal on line 28 from node 23. The signals 20, 28 are used as inputs to a three dimensional look-up table. The resulting ratio signal is passed via line 64 to the roadwheel command unit 66 where it is used along with the position signal from line 20 to calculate the roadwheel command signal 70.

The purpose of the roadwheel command unit 66 is to provide theta correction, that is, to correct the roadwheel position to reflect the position of the steering column correctly. This is needed for situations where the reaction torque motor moves to provide a reaction torque to the driver in response to a movement of the roadwheels. However, the driver does not necessarily permit the steering wheel to turn, though he feels the reaction torque. The effect of the roadwheels moving without the steering column moving is undesirable so a theta correction is provided and a theta-corrected roadwheel command signal 70 is generated.

The theta-corrected roadwheel command signal 70 passes along to the Ackerman correction unit 68. The Ackerman correction unit 68 adjusts the roadwheel angles to correct for errors in the steering geometry. This enables each wheel to be steered in such a manner as to negotiate a curve along its natural rolling path. Though the Ackerman unit is optional, it is preferred because the inner wheel tracks a smaller radius than the outer wheel to track a common turn center, thus the inner wheel needs to be steered at a greater angle.

An Ackerman command signal 74 is sent to a left roadwheel switch 78 and a right roadwheel switch 76. The switches 76, 78 combine the Ackerman command signal with the roadwheel command signal 70 and a signal representative of the sign of the roadwheel signal 80 to determine the left and right roadwheel signals. The left 19 and right 22 roadwheel signals are then passed back to the roadwheel units 16.

It is important to note that all the examples provided herein relate to a vehicle having two steerable wheels. However, this type of system could be easily extended to a vehicle that requires all four wheels to be steered simultaneously by adding a second roadwheel unit 16.

The left 19 and right 22 roadwheel signals are typically representative of the desired roadwheel angle. To use this information effectively, the roadwheel plant dynamics unit 42 may need this information in a signal representative of a linear value. Accordingly, the roadwheel control unit 38 (from FIG. 3) may contain additional functionality as shown in FIG. 6.

Figure 6:
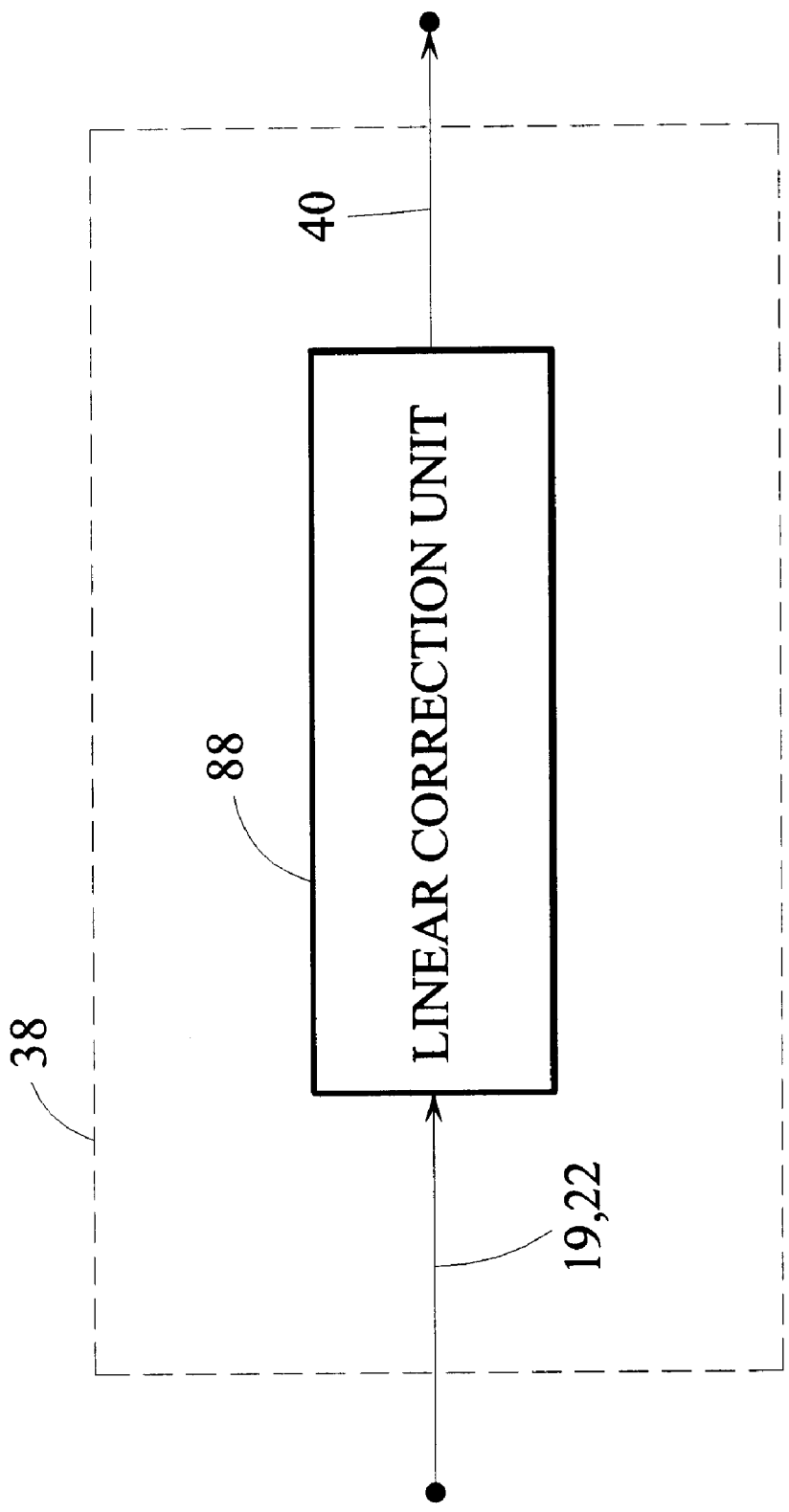
FIG. 6 is a block diagram of the roadwheel control unit shown in FIG. 3.

Referring to FIG. 6, there is shown the roadwheel control unit 38 wherein a linear correction unit 88 transforms the roadwheel signals 19, 22 into a linear travel signal that is representative of the linear value required for the left or right wheel, respectively. The linear travel signal is passed to the plant dynamics unit 42 (see FIG. 3) as the position command signal 40. The linear correction unit 88 uses the given steering geometry of the vehicle to calculate a linear position in order to attain a desired rotational position. It is contemplated that these calculations would be compiled into a lookup table to optimize controller performance.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A steer-by-wire control system comprising:

a master control unit;

at least one roadwheel unit electrically connected to said master control unit;

at least one steering wheel unit electrically connected to said master control unit;

a vehicle speed sensor for producing a vehicle speed signal, said vehicle speed sensor electrically connected to said master control unit;

wherein said at least one roadwheel unit includes a roadwheel position sensor and a least one tie rod sensor to produce and transmit a tie rod force signal;

wherein said at least one steering wheel unit includes a steering wheel position sensor to produce and transmit a steering wheel position signal;

wherein said master control unit calculates at least one roadwheel command signal in response to said tie rod force signal and said steering wheel position signal;

wherein said master control unit including a torque unit to calculate and produce a reaction torque signal in response to said tie-rod force signal and said vehicle speed signal; and wherein said torque unit uses said tie rod force signal as an index to a plurality of torque look-up tables and blending the outputs thereof to generate a blended value.

2. The steer-by-wire control system of claim 1 wherein said look-up table outputs are blended in a ratio dependent upon said vehicle speed signal.

3. The steer-by-wire control system of claim 1 further comprising:

a position control unit, said position control unit calculates and produces a variable steering ratio signal in response to said steering wheel position signal and said vehicle speed signal.

4. The steer-by-wire control system of claim 3 wherein said variable steering ratio signal is calculated using said steering wheel position signal and said vehicle speed signal as inputs to a steering ratio look-up table.

5. The steer-by-wire control system of claim 3 wherein said position control unit further comprises a roadwheel command unit that calculates a theta correction and generates a theta corrected roadwheel command signal from said variable steering ratio signal and said steering wheel position signal.

6. The steer-by-wire control system of claim 3 wherein said position control unit calculates and produces at least one roadwheel command signal in response to said steering wheel position signal and said steering ratio signal.

7. The steer-by-wire control system of claim 6 wherein said position control unit further includes an Ackerman correction unit for producing a left roadwheel signal and a right roadwheel signal in response to said roadwheel command signal.

8. The steer-by-wire control system of claim 7 wherein said roadwheel unit includes a linear correction unit for calculating and producing a linear position command signal in response to a roadwheel command signal.

9. A method for controlling a vehicle comprising:

generating at least one tie-rod force signal;

generating a vehicle speed signal;

generating a steering wheel position signal;

combining said signals in a master control unit;

generating a steering wheel reaction torque signal in response to said tie rod force signal and said vehicle speed signal;

generating at least one roadwheel command signal in response to said steering wheel position signal and said vehicle speed signal;

calculating a first torque signal from a look-up table;

calculating a second torque signal from a second look-up table; and calculating said steering wheel reaction torque signal as a blended value of said first and second torque signals.

10. A method for controlling a vehicle as in claim 9 comprising:

calculating and producing a variable steering ratio signal in response to said steering wheel position signal and said vehicle speed signal.

11. A method for controlling a vehicle as in claim 10 wherein:

said calculating and producing at least one roadwheel command signal is in response to said steering wheel position signal and said steering ratio signal.

12. A method for controlling a vehicle as in claim 11 comprising:

calculating an Ackerman correction factor;

modifying said roadwheel command signal with said Ackerman correction factor to adjust the vehicle wheels to track about a common center.

13. A method of controlling a vehicle as in claim 12 comprising:

calculating and producing a linear position command signal.

14. A method of controlling a vehicle as in claim 11 further comprising:

calculating and producing a left and right roadwheel command associated with the vehicles left and right roadwheel respectively.

* * * * *